(12) United States Patent
Kumagai et al.

(10) Patent No.: US 11,198,092 B2
(45) Date of Patent: Dec. 14, 2021

(54) EXHAUST GAS TREATMENT METHOD AND EXHAUST GAS TREATMENT APPARATUS

(71) Applicant: CHIYODA CORPORATION, Yokohama (JP)

(72) Inventors: Kazuya Kumagai, Yokohama (JP); Hironobu Marukawa, Yokohama (JP)

(73) Assignee: CHIYODA CORPORATION, Kanagawa (JP)

( * ) Notice: Subject to any disclaimer, the term of this patent is extended or adjusted under 35 U.S.C. 154(b) by 0 days.

(21) Appl. No.: 16/962,583

(22) PCT Filed: Jan. 10, 2019

(86) PCT No.: PCT/JP2019/000434
§ 371 (c)(1),
(2) Date: Jul. 16, 2020

(87) PCT Pub. No.: WO2019/142715
PCT Pub. Date: Jul. 25, 2019

(65) Prior Publication Data
US 2020/0398218 A1  Dec. 24, 2020

(30) Foreign Application Priority Data

Jan. 18, 2018  (JP) .............................. JP2018-006273

(51) Int. Cl.
*B01D 53/78* (2006.01)
*B01D 53/50* (2006.01)
(Continued)

(52) U.S. Cl.
CPC ........... *B01D 53/78* (2013.01); *B01D 53/501* (2013.01); *B01D 53/1481* (2013.01);
(Continued)

(58) Field of Classification Search
CPC ............ B01D 53/1481; B01D 53/501; B01D 53/504; B01D 53/78; B01D 2257/302; B01D 2258/0283
See application file for complete search history.

(56) References Cited

U.S. PATENT DOCUMENTS 5,429,808 A   7/1995   Kuroda et al.

FOREIGN PATENT DOCUMENTS

JP   64-18429 A   1/1989
JP   2-71823 A    3/1990
(Continued)

OTHER PUBLICATIONS

Notification Concerning Transmittal of International Preliminary Report on Patentability (Forms PCT/IB/326) issued in counterpart International Application No. PCT/JP2019/000434 dated Jul. 30, 2020 with Forms PCT/IB/373, PCT/IB/338 and PCT/ISA/237. (21 pages).

(Continued)

*Primary Examiner* — Timothy C Vanoy
(74) *Attorney, Agent, or Firm* — Westerman, Hattori, Daniels & Adrian, LLP

(57) ABSTRACT

This invention provides a continuous liquid phase type wet exhaust gas treatment method for removing sulfur oxides from exhaust gas and collecting it as gypsum, which method is simple and humidifying liquid is uniformly sprayed into exhaust gas with it. The method is characterized in that humidifying liquid is injected downwardly in a region where exhaust gas flows vertically downwardly.

8 Claims, 11 Drawing Sheets

(51) Int. Cl.
*B01D 53/14* (2006.01)
*B01F 3/04* (2006.01)

(52) U.S. Cl.
CPC .. *B01D 2251/404* (2013.01); *B01D 2251/606* (2013.01); *B01D 2257/302* (2013.01); *B01F 3/04758* (2013.01)

(56) References Cited

FOREIGN PATENT DOCUMENTS

| | | | |
|---|---|---|---|
| JP | 6-134251 A | 5/1994 | |
| JP | 9-867 A | 1/1997 | |
| JP | 2004-358294 A | 12/2004 | |
| JP | 2008-114189 A | 5/2008 | |
| JP | 2015-71141 A | 4/2015 | |
| KR | 2019 032 738 A | * 3/2019 | ........... B01D 47/063 |

OTHER PUBLICATIONS

International Search Report dated Mar. 26, 2019, issued in counterpart International Application No. PCT/JP2019/000434 (1 page).

* cited by examiner

FIG. 5
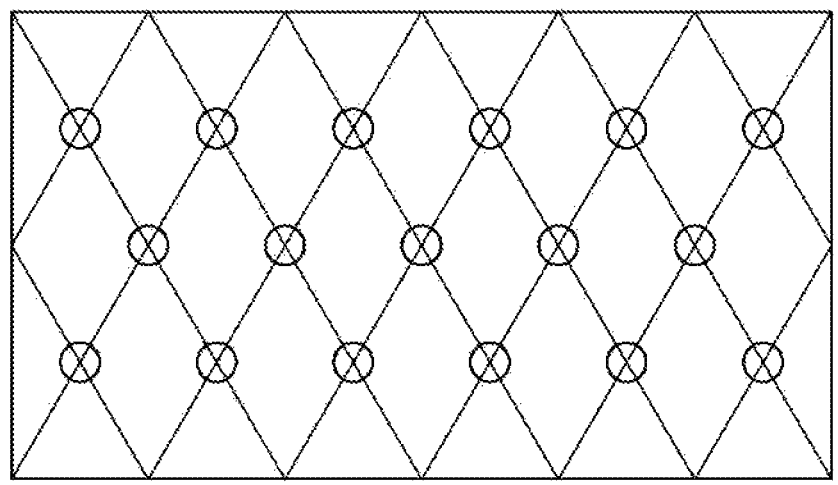
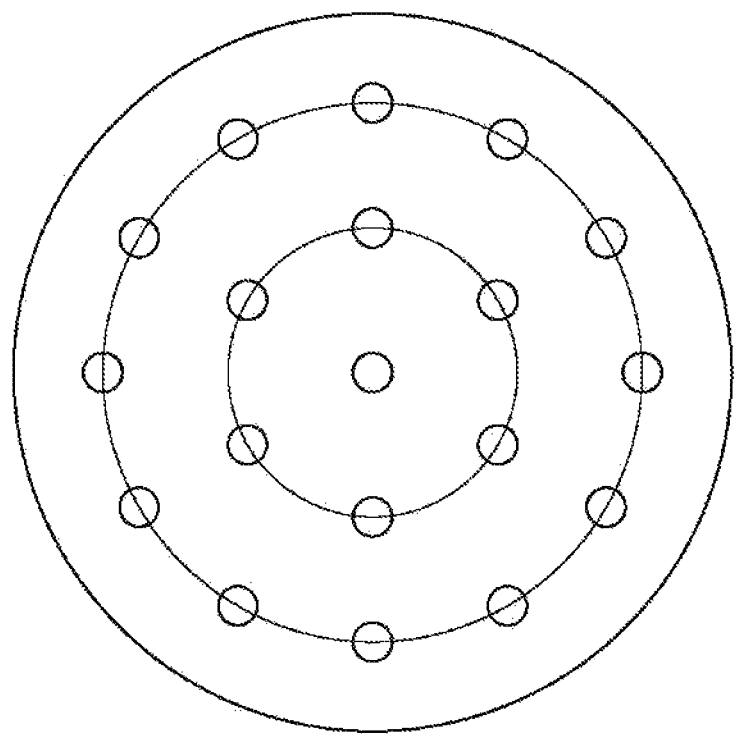

EXHAUST GAS TREATMENT METHOD AND EXHAUST GAS TREATMENT APPARATUS

TECHNICAL FIELD

The present invention relates to an exhaust gas treatment method and an exhaust gas treatment apparatus.

BACKGROUND ART

Exhaust gas treatment (smoke exhaust desulfurization) methods for eliminating sulfur oxides, sulfurous acid gas (sulfur dioxide) in particular, from combustion exhaust gas (smoke exhaust) include the wet method of bringing exhaust gas into contact with absorption liquid that contains an alkaline agent to absorb/eliminate sulfur oxides. Since the wet method is suited to treat exhaust gas that contains highly concentrated sulfur oxides at low cost in large quantities, it is being widely employed for exhaust gas treatment in large scale waste combustion furnaces, coal burning boilers in thermal power plants and so on.

The wet exhaust gas treatment method includes the type of bringing exhaust gas into contact with absorption liquid by spraying absorption liquid into a flow of exhaust gas or by causing exhaust gas to flow on a filler bed, while causing absorption liquid to flow down onto the filler surface (continuous gas phase type) and the type of bringing exhaust gas into contact with absorption liquid by blowing exhaust gas into the absorption liquid contained (filled) in a container (continuous liquid phase type). Generally, if compared with the continuous gas phase type, the continuous liquid phase type provides advantages including that compact apparatus can be used with it because it can withstand load fluctuations and achieve a high gas/liquid contact efficiency and that it does not require the use of a large capacity liquid circulation pump and hence can curb the power costs to a low level.

Jet Bubbling Reactors (JBRs) described in Patent Literature 1 and in Patent Literature 2 are known as continuous liquid phase type wet exhaust gas treatment apparatus. FIG. 1 is a schematic illustration of a JBR described in Patent Literature 1. As shown in FIG. 1, a JBR is generally so arranged that the internal space of an upright tubular container (reaction tank) 101 (which is not necessarily limited to cylindrical container showing a circular cross section but may be an angularly tubular container showing a rectangular cross section) is vertically partitioned into three tiers and a lower chamber (reaction chamber) 102 is made to contain absorption liquid 104 with a space 103 left on the liquid surface, whereas the exhaust gas introduced into a middle chamber (exhaust gas inlet space) 105 is blown into under the liquid surface of the absorption liquid 104 by way of a plurality of exhaust gas dispersion pipes (exhaust gas introducing pipes) 106 extending from the floor surface of the middle chamber 105 into the absorption liquid 104 in the lower chamber 102 and the post gas/liquid contact treatment gas produced as the blown in exhaust gas is made to go up through the absorption liquid 104 as fine bubbles is separated in the space 103 on the liquid surface (to be referred to as "treated gas" hereinafter) is then led into an upper chamber (exhaust gas outlet space) 107 and discharged.

Liquid prepared by adding an alkaline agent (usually slurry of finely crushed limestone) to water (usually industrial water) is employed as absorption liquid. Dissolved oxygen is fed into the prepared absorption liquid by blowing air or some other oxygen containing gas into the absorption liquid from an oxygen feeding means (oxygen-containing gas spouting nozzle) 108 arranged near the bottom of the lower chamber. The sulfur oxides (sulfurous acid gas) contained in the exhaust gas that is brought into contact with the absorption liquid is absorbed into the absorption liquid to become sulfurous acid, which is then oxidized by the dissolved oxygen in the absorption liquid to become sulfuric acid and the sulfuric acid is then made to react with an alkaline agent to produce calcium sulfate (gypsum). The produced gypsum is dissolved only to a low degree and hence deposited in the absorption liquid so that the gypsum can be separated and collected from the absorption liquid by drawing out part of the absorption liquid that contains the deposited gypsum and subjecting it to an appropriate solid/liquid separating operation. In the JBR, all the treatment steps including the absorption, the oxidation, the neutralization and the crystallization proceed in a simultaneous and parallel way in the lower chamber of the JBR main body container (reaction tank) so that it has a feature that the entire exhaust gas desulfurization apparatus can be formed as a simple and compact one.

Additionally, JBRs are characterized in that they show a particularly high gas/liquid contact ratio among continuous liquid phase type exhaust gas desulfurization apparatus. This is because, as a result of blowing exhaust gas into absorption liquid at high speed, bubbles of exhaust gas are micronized by strong shearing force and mixed with the absorption liquid such that fine bubbles are highly densely dispersed in the region between the level at which exhaust gas is blown into (the plane located at a predetermined height from the liquid surface) and the liquid surface, which region has a thickness several to tens of several centimeters, to form there a jet bubbling layer 109 having a large gas/liquid contact area. A stirring means 110 is provided below the jet bubbling layer forming region to highly uniformly disperse the alkaline agent into the entire absorption liquid and cause the absorption liquid to vertically circulate by stirring the absorption liquid so as to feed the dissolved oxygen that has been fed into a lower layer (at and near the bottom of the lower chamber) of the absorption liquid to the upper jet bubbling layer.

In a wet exhaust gas treatment apparatus such as a JBR, exhaust gas needs to be cooled to the saturation temperature in order to make the sulfur oxides (sulfurous acid gas) in the exhaust gas to efficiently be absorbed into liquid. Therefore, it is a popular practice to arrange a dust collector tower (spray tower), which also operates to eliminate dust such as soot, in a fore stage of the exhaust gas treatment apparatus or spray humidifying liquid into the exhaust gas to be introduced into the exhaust gas treatment apparatus as described in Patent Literature 1 and Patent Literature 2 in order to humidify and cool the exhaust gas to the saturation temperature in advance prior to bringing it into contact with absorption liquid. In such an instance, humidifying liquid is usually sprayed into the middle chamber (exhaust gas introducing chamber) and/or into the exhaust gas introducing duct connected to the middle chamber. A part of the sprayed humidifying liquid accompanies the exhaust gas and is taken into the absorption liquid in the lower chamber (reaction chamber) and another part is separated from the exhaust gas in the middle chamber or in the exhaust gas introducing duct and drained as humidifying liquid.

In a JBR of Patent Literature 1 as illustrated in FIG. 1, water (the first humidifying liquid) is sprayed as cooling liquid from a cooling liquid injection nozzle (cooling liquid atomizing nozzle) 112 arranged in an exhaust gas introducing duct 111 and alkaline agent-containing water (the second humidifying liquid) is sprayed as absorption liquid from an absorption liquid injection nozzle (absorption liquid atomizing nozzle) 113 arranged (at the ceiling) in the middle chamber 105. Note that a part of the absorption liquid in the lower chamber is drawn out from an absorption liquid drawing out line (drainage pipe) 114 and, after gypsum is separated and collected by way of a liquid/solid separating operation (not shown), most of the remaining mother liquid is supplemented with an alkaline agent and returned into the lower chamber from an absorption liquid feed line (absorption liquid feed pipe) 115, while another part is drawn out to prevent accumulation of dissolved salts and so on in the absorption liquid and fed to a wastewater treatment apparatus. On the other hand, the treated gas led into the upper chamber (treated gas discharge chamber) 107 is discharged from a treated gas discharge duct (exhaust gas lead-out duct) 116 by way of a gas/liquid separator (mist eliminator) 117.

Referring to FIG. 1, of the humidifying liquid (cooling liquid and absorption liquid) sprayed into the exhaust gas, both the part that accompanies the exhaust gas and the part that is separated from the exhaust gas as drainage (drained humidifying liquid) are taken into the absorption liquid 104 in the lower chamber 102 by way of the exhaust gas dispersion pipes 106. However, the drained humidifying liquid may be separated from the exhaust gas (and the humidifying liquid accompanying the exhaust gas) and handled so as to prevent it from being directly mixed with the absorption liquid in the bottom chamber. FIG. 2 is a schematic illustration of a JBR described in Patent Literature 2. Referring to FIG. 2, the reference numerals obtained by adding 100 to the respective corresponding reference numerals in FIG. 1 denote the components shown in FIG. 2 that correspond to the respective components denoted by the respective original reference numerals. In the JBR of FIG. 2, while cooling liquid (industrial water) that operates as the first humidifying liquid is sprayed from a cooling liquid injection nozzle (industrial water feed pipe) 212 arranged in an exhaust gas introducing duct (gas to be treated-introducing port) 211 into the exhaust gas just like the JBR in FIG. 1, absorption liquid that operates as the second humidifying liquid is part of an absorption liquid (alkaline agent-containing liquid) 204 in a lower chamber (alkaline agent-containing liquid chamber) 202 that is drawn out from an absorption liquid drawing out line 214 and sprayed not only from an absorption liquid injection nozzle (the second humidifying liquid feed pipe) 213b arranged in a middle chamber (humidifying liquid-contacting chamber) 205 but also from an absorption liquid injection nozzle (the first humidifying liquid feed pipe) 213a arranged in the exhaust gas introducing duct 211. Then, while most of the drained absorption liquid (the drained humidifying liquid that is produced in the middle chamber) that is sprayed from the absorption liquid injection nozzle 213b arranged in the middle chamber is mixed into the absorption liquid 204 along with exhaust gas after passing through exhaust gas dispersion pipes (gas down corner pipes) 206, the cooling liquid and the drained absorption liquid (the drained humidifying liquid produced in the exhaust gas introducing duct) that are sprayed respectively from the cooling liquid injection nozzle 212 and the absorption liquid injection nozzle 213a arranged in the exhaust gas introducing duct 211 flow down through a liquid down corner pipe 218, which is a path arranged separately from the exhaust gas dispersion pipes (gas down corner pipes) 206.

The front end of the liquid down corner pipe 218 extends to a position located deeper than the front ends of the exhaust gas dispersion pipes (gas down corner pipes) 206 and passes through a jet bubbling layer 209 and hence it is filled with liquid (absorption liquid and drained humidifying liquid) to a certain depth to go upward from the front end outlet port so that the drained humidifying liquid that has flown down through it remains for a time being in the inside of the liquid down corner pipe 218 and hence is not mixed with the absorption liquid main body immediately. Then, the liquid (mainly consisting of the drained humidifying liquid) remaining in the inside of the liquid down corner pipe 218 is drawn out by means of a pump 220 by way of a gas drawing out means (air separator) 219 and the gypsum is separated and collected from the drawn-out liquid by a solid/liquid separation means 221. The remaining mother liquid is partly returned into the lower chamber from an absorption liquid feed line 215 by way of a circulation line 222 and the rest is sent to a wastewater treatment apparatus. Note that gypsum slurry is added from alkaline agent introducing means 223 in order to compensate the fall of the concentration of the alkaline agent in the absorption liquid due to the collection of gypsum. Since the absorption liquid main body in the lower chamber contains dissolved oxygen to a large extent, it may contain the peroxides (of hexavalent selenium and so on) formed by such oxygen but such peroxides are reduced as absorption liquid is sprayed into the exhaust gas in the exhaust gas introducing duct to absorb the sulfurous acid gas in the exhaust gas so that the arrangement for collecting gypsum only from the drained and separated humidifying liquid as shown in FIG. 2 provides an advantage that any possible adverse effect on the wastewater treatment apparatus can be prevented from taking place.

CITATION LIST

Patent Literature

PTL 1: Japanese Patent Application Laid-Open No. 64-18429

PTL 2: Japanese Patent Application Laid-Open No. 2015-71141

SUMMARY OF INVENTION

Technical Problem

In continuous liquid phase type wet exhaust gas desulfurization apparatus such as JBRs, exhaust gas is generally introduced substantially horizontally into the apparatus from the lateral wall of the apparatus main body (tubular container) as shown in FIG. 1 and FIG. 2. For this reason, when humidifying liquid (cooling liquid and absorption liquid) is sprayed into the exhaust gas in the exhaust gas introducing duct that is connected to the apparatus main body, the spray nozzles for injecting humidifying liquid are arranged in the horizontally extending exhaust gas introducing duct. In other words, humidifying liquid is injected into the horizontal flow of exhaust gas. Then, conventionally, the plurality of spray nozzles are evenly arranged on a vertical cross section of the horizontal flow of exhaust gas and humidifying liquid is sprayed in a horizontal direction in order to evenly spray liquid to the flow of exhaust gas.

However, when the horizontal flow of exhaust gas has a large cross sectional area, head differences arise between the nozzles arranged in an upper part and the nozzles arranged in a lower part and hence there arises a problem that the nozzles arranged in a lower part show a high injection pressure to make the injection rate and the injection speed uneven in the vertical direction and also the injected liquid drops show vertically non-uniform diameters (the liquid drops injected from the nozzles in a lower part are finer drops). While a technique of correcting the injection rate and the injection speed to make them uniform in the vertical direction by adjusting the nozzle diameters and the nozzle placement density may be conceivable, a correction by means of such a technique requires complex adjustment operations and the amount of correction also needs to be adjusted as a function of the properties (viscosity and concentration of solid contents) of the humidifying liquid to make such an adjustment not an easy one. Additionally, it is difficult to adjust the diameters of the liquid drops and make them uniform ones by means of such a technique.

Thus, there is a demand for a method and an apparatus having a simple configuration that allow humidifying liquid to be sprayed constantly substantially uniformly relative to the flow of exhaust gas without requiring complex adjustment operations as described above.

Solution to Problem

According to the present invention, the above-described problem is dissolved by providing an exhaust gas treatment method of eliminating sulfur oxides from exhaust gas and collecting the eliminated sulfur oxides as solid reaction product, the method comprising:

a gas/liquid contacting step of depositing the reaction product of a reaction of an alkaline agent, dissolved oxygen and sulfur oxides in an aqueous absorption liquid by executing a gas/liquid contacting operation of introducing sulfur oxides-containing exhaust gas into the aqueous absorption liquid containing the alkaline agent and dissolved oxygen; and a solid/liquid separation step of collecting the solid reaction product by executing a solid/liquid separating operation relative to the aqueous absorption liquid containing the deposited solid reaction product;

the method being characterized by additionally comprising:

a humidifying/cooling step of humidifying and cooling the exhaust gas by spraying humidifying liquid into the flow of exhaust gas prior to the gas/liquid contacting step;

humidifying liquid being injected vertically downwardly in a region where exhaust gas flows vertically downwardly.

Additionally, according to the present invention, the above-described problem is also dissolved by providing an exhaust gas treatment apparatus comprising:

an upright tubular container having an internal space vertically partitioned into three chambers of an upper chamber, a middle chamber and a lower chamber as viewed in the vertical direction;

the lower chamber containing aqueous absorption liquid in turn containing an alkaline agent and dissolved oxygen;

the middle chamber having at the lateral wall thereof an exhaust gas introducing port for introducing exhaust gas and on the bottom thereof a plurality of exhaust gas dispersion pipes open to the internal space of the middle chamber and running through the floor thereof, the exhaust gas dispersion pipes vertically extending with their front ends penetrating into the aqueous absorption liquid contained in the lower chamber, each of the exhaust gas dispersion pipes having near its front end spouting orifices for spouting exhaust gas below the liquid surface of the aqueous absorption liquid;

the lower chamber also having near the bottom thereof an oxygen feed means for blowing oxygen-containing gas into the aqueous absorption liquid and at the ceiling thereof a treated gas rising path open to the internal space of the lower chamber and running through the middle chamber so as to be open to the internal space of the upper chamber;

the upper chamber having a treated gas discharge port for discharging treated gas; and the exhaust gas treatment apparatus being so arranged that the exhaust gas introduced into the middle chamber from the exhaust gas introducing port is spouted out as bubbles below the liquid surface of the aqueous absorption liquid contained in the lower chamber by way of the plurality of exhaust gas dispersion pipes, subsequently separated as treated gas in the space formed on the liquid surface of the aqueous absorption liquid and then forced to flow into the upper chamber by way of the treated gas rising path so as to be discharged from the upper chamber by way of the treated gas discharge port;

the exhaust gas treatment apparatus being characterized in that an exhaust gas introducing duct having an vertically extending region for allowing exhaust gas to flow downwardly is connected to the exhaust gas introducing port and a humidifying liquid injection means for spraying humidifying liquid downwardly into the downwardly flowing exhaust gas in the exhaust gas introducing duct is arranged in the vertically extending region.

Advantageous Effects of Invention

Thus, according to the present invention, humidifying liquid is uniformly sprayed into the exhaust gas to be subjected to a gas/liquid contacting operation in a wet exhaust gas treatment that includes a continuous liquid phase type gas/liquid contacting operation of introducing exhaust gas into absorption liquid so that the exhaust gas is uniformly humidified and cooled to make it possible to prevent part of the exhaust gas from being spouted into the aqueous absorption liquid in an insufficiently humidified and cooled state.

Additionally, according to the present invention, since exhaust gas and humidifying liquid are brought into contact with each other in the region where exhaust gas vertically flows, if the contact region is made long to provide a sufficiently long contact time in order to improve the effect of humidifying and cooling the exhaust gas, the area for installing the exhaust gas treatment apparatus (including the contact region) is prevented from becoming excessively large.

BRIEF DESCRIPTION OF DRAWINGS

FIG. 5 shows exemplar modes of uniformly arranging a plurality of humidifying liquid injection nozzles.

DESCRIPTION OF EMBODIMENTS

Figure 1:
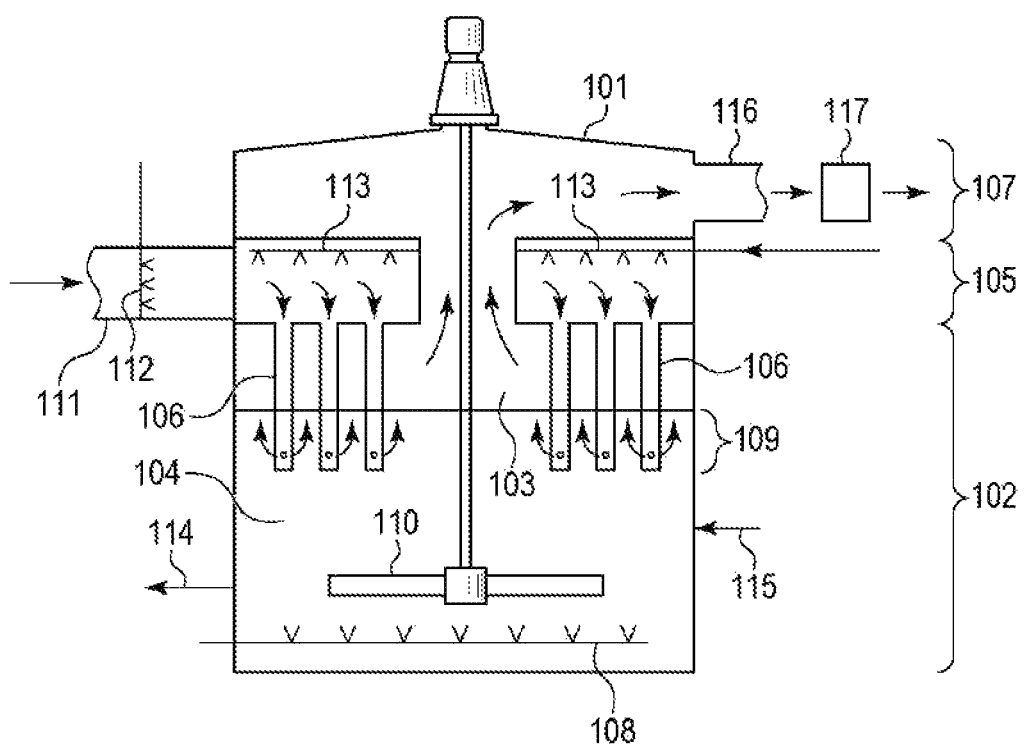
FIG. 1 shows an exemplar conventional continuous liquid phase type wet exhaust gas treatment apparatus.
Figure 2:
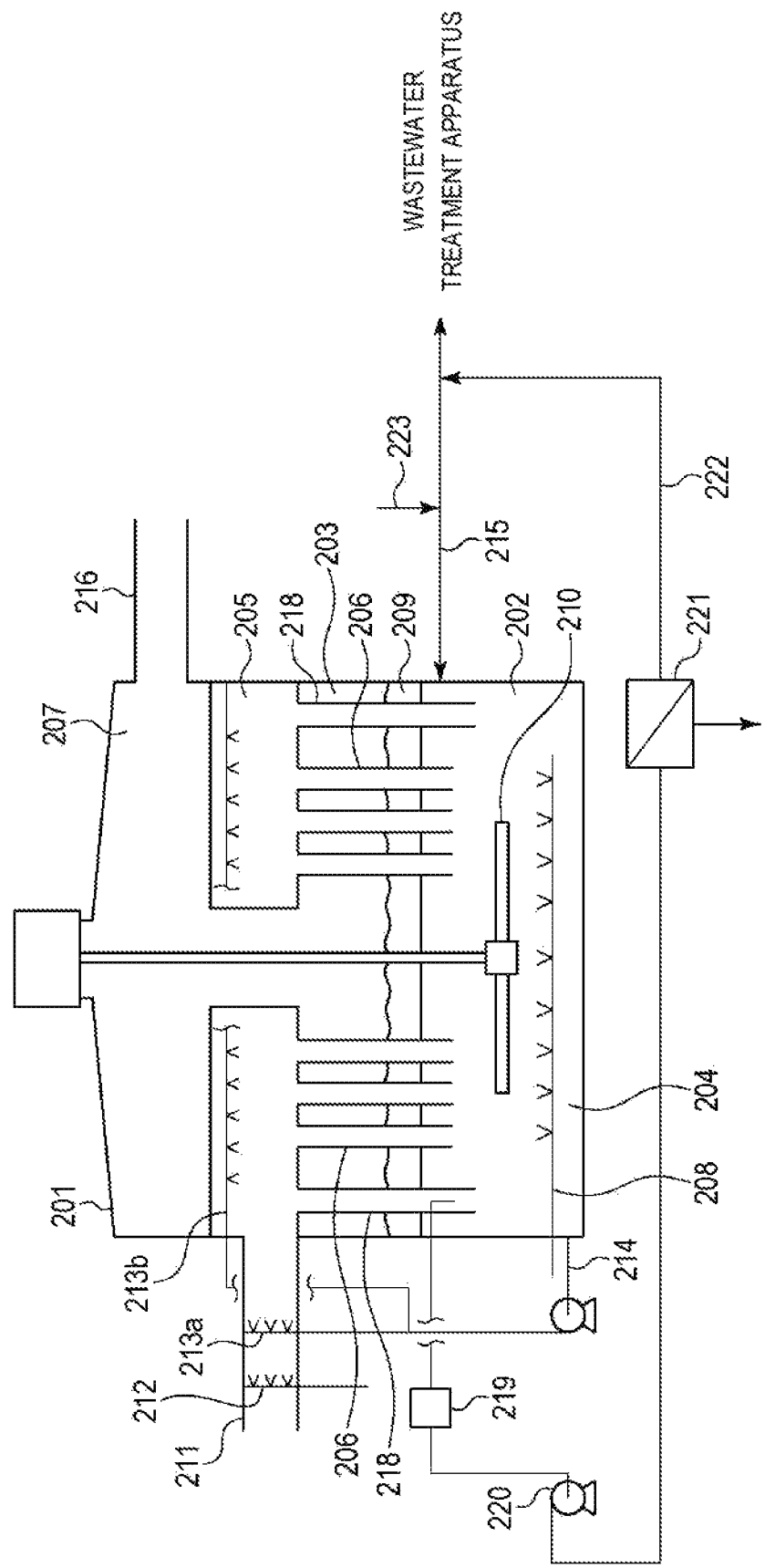
FIG. 2 shows another exemplar conventional continuous liquid phase type wet exhaust gas treatment apparatus.

The method of the present invention is embodied by filling a container with aqueous absorption liquid that contains an alkaline agent and dissolved oxygen and introducing sulfur oxides-containing exhaust gas into the aqueous absorption liquid to execute a gas/liquid contacting operation. Such aqueous absorption liquid can be prepared by adding an alkaline agent to water and then blowing oxygen-containing gas into the liquid.

While industrial water is usually employed as water, natural water or reclaimed water may alternatively be employed so long as the water quality is permissible. However, if the objective is to collect high quality gypsum, water preferably does not contain multivalent positive ions other than calcium, heavy metals and organic matters. The alkaline agent to be added to water is for ultimately producing gypsum by neutralizing sulfurous acid that is produced as sulfur oxides (mainly sulfurous acid gas) is dissolved into aqueous absorption liquid and sulfuric acid that is produced as sulfurous acid is oxidized and hence it is preferably basic calcium salt such as calcium carbonate and calcium hydroxide. Normally, finely crushed limestone (calcium carbonate) is employed from the viewpoint of cost. Since calcium carbonate is hardly dissolved into water, finely crushed limestone is added to water (aqueous absorption liquid) as slurry. However, the finely crushed limestone that is added as slurry will quickly be dissolved when it is added to the aqueous absorption liquid that has absorbed sulfurous acid gas and whose pH has slightly been shifted to the acidic side (about 5 to 7). Oxygen-containing gas is for feeding dissolved oxygen to be used to oxidize sulfurous acid into sulfuric into the aqueous absorption liquid and air is popularly employed for it, although some other gas (for example, pure oxygen or oxygen enriched air) may alternatively be employed without any problem so long as it contains oxygen and does not contain any ingredient that obstructs the gypsum-producing reaction.

As exhaust gas that contains sulfur oxides is blown as fine bubbles into the aqueous absorption liquid that contains an alkaline agent and dissolved oxygen in the gas/liquid contacting step of the method according to the present invention, the sulfur oxides in the exhaust gas are dissolved into the aqueous absorption liquid through the gas/liquid contacting interface that has a large area. The sulfur oxides are mostly sulfurous acid gas (sulfur dioxide) and as it is dissolved into the aqueous absorption liquid, it is bonded to water molecules to turn into sulfurous acid. While part of the sulfurous acid is ionized in the aqueous absorption liquid to produce sulfurous acid ions and hydrogen sulfite ions (and hydrogen ions), they are turned into sulfuric acid ions (partly hydrogen sulfate ions) as they are oxidized by the dissolved oxygen. When the sulfuric acid ions are bonded to calcium ions that are supplied as the alkaline agent (finely powdery limestone) is dissolved, calcium sulfate is produced and, since its solubility is relatively small, gypsum (hydrate of calcium sulfate) is deposited in the absorption liquid as solid reaction product. However, the actual reaction does not necessarily proceed in the above-described order and may conceivably be more complex. For example, the oxidation from sulfurous acid ions into sulfuric acid ions (in a liquid phase or in a solid phase), the production of calcium sulfate or calcium sulfite and the deposition of the solid reaction product (ultimately gypsum) may presumably take place simultaneously and in parallel.

In any instance, in the stage where the gas/liquid contacting step of the method of the present invention has proceeded to a certain extent, the aqueous absorption liquid gets into a state of aqueous suspension that contains gypsum as solid reaction product. Accordingly, the gypsum that is deposited in the absorption liquid can be separated and collected when an appropriate solid/liquid separating operation is executed on the aqueous absorption liquid in the liquid/liquid separation step of the method of the present invention. The mother liquid from which gypsum is separated and eliminated can be employed again as aqueous absorption liquid by replenishing the alkaline agent (limestone shiny). In actuality, the method of the present invention is often executed not as a batch operation but as a continuous operation and therefore the solid/liquid separation step of the method of the present invention is a step of extracting a part of the aqueous absorption liquid employed in the gas/liquid contacting step, then executing a solid/liquid separating operation on it to separate and collect gypsum and subsequently returning the mother liquid, from which gypsum has been separated and eliminated (and to which the alkaline agent is replenished), to the gas/liquid contacting step. In other words, in the instance of a continuous operation, the gas/liquid contacting step and the solid/liquid separation step of the method of the present invention are executed simultaneously and in parallel.

The method of the present invention comprises a humidifying/cooling step of spraying humidifying liquid into the flow of exhaust gas to be subjected to the gas/liquid contacting step so as to humidify and cool the exhaust gas and the aqueous absorption liquid (containing the deposited solid reaction product) in the gas/liquid contacting step is drawn out so as to be used at least as part of the humidifying liquid to be sprayed. Then, the method is characterized in that humidifying liquid is sprayed vertically downwardly into the flow of exhaust gas within the region where exhaust gas flows vertically downwardly. Preferably, at this time, the aqueous absorption liquid (containing the deposited solid reaction product) in the gas/liquid contacting step is drawn out so as to be used at least as part of the humidifying liquid to be sprayed and the humidifying liquid sprayed into the exhaust gas is separated from the exhaust gas and collected as drained humidifying liquid. Then, also preferably, a solid/liquid separating operation is executed only on the drained and collected humidifying liquid and the solid reaction product (mainly gypsum) is separated and collected.

With the method of this invention, as humidifying liquid is injected vertically downwardly into the exhaust gas also flowing vertically downwardly, the drops of the humidifying liquid that is spouted out from, for example, a single nozzle that is placed at the center of the flow is dispersed symmetrically relative to the central axis of the flow. When a plurality of nozzles are arranged, no head difference arises among the nozzles provided that the nozzles are arranged on the same cross section so that humidifying liquid can easily be sprayed uniformly relative to the cross section of the flow by arranging the nozzles with a uniform density relative to the cross section of the flow. Then, therefore, the exhaust gas can be humidified and cooled uniformly to prevent a situation that part of the exhaust gas is spouted into the aqueous absorption liquid in a state of having been humidified and cooled insufficiently from taking place.

Additionally, while exhaust gas and humidifying liquid need to be held in contact with each other for a sufficient period of time to raise the efficiency of humidifying and cooling the exhaust gas, with the method of this invention, exhaust gas and humidifying liquid are brought into contact in the region where exhaust gas flows vertically and hence the installation area of the exhaust gas treatment apparatus (including the contact region) can be prevented from becoming excessively large even when the contact region is made long to secure a long contact time. Particularly, since JBRs are provided with a feature of compactness of the apparatus A, the advantageous effect of the present invention that the installation area does not become excessively large even when the contact region of exhaust gas and humidifying liquid prior to entering the apparatus is made long will be a remarkably advantageous one.

As described above, at least part of the humidifying liquid to be sprayed into the exhaust gas is preferably the aqueous absorption liquid employed in the gas/liquid contacting step. Additionally, in an instance where the gas/liquid contacting step is executed in a plurality of apparatus, the aqueous absorption liquid to be used as (part of the) humidifying liquid may not necessarily be the one that is drawn out from the gas/liquid contacting step where the exhaust gas into which the humidifying liquid is to be sprayed is fed. For example, the aqueous absorption liquid drawn out from a plurality of gas/liquid contacting steps may be put together and pooled and then it may be fed as (part of) the humidifying liquid to be sprayed into the exhaust gas that is fed in for the individual gas/liquid contacting steps. Note, however, that the amount of aqueous absorption liquid will undesirably fluctuate unless aqueous absorption liquid is replenished by an amount that matches the amount of the aqueous absorption liquid drawn out for each of the individual gas/liquid contacting steps.

In a particularly preferable embodiment of the present invention, at least part of the humidifying liquid to be sprayed into exhaust gas is the aqueous absorption liquid in the gas/liquid contacting step and part of the humidifying liquid that is sprayed into exhaust gas prior to being fed to the gas/liquid contacting step is separated from the flow of exhaust gas before the exhaust gas is fed to the gas/liquid separation step and collected so that only the separated and collected humidifying liquid is fed to the solid/liquid separation step for collecting the solid reaction product (gypsum). In other words, the absorption liquid employed in the gas/liquid contacting step is preferably not directly (namely without being sprayed into exhaust gas before the latter is fed to the gas/liquid contacting step) fed to the solid/liquid separation step.

With this embodiment, since all the aqueous absorption liquid that is fed to the solid/liquid separation step is brought into contact with exhaust gas before the latter is fed to the gas/liquid contacting step and the solid reaction product (gypsum) in the drained humidifying liquid is subjected to a reduction treatment as a result of the absorption of the sulfurous acid gas in the exhaust gas, it is possible to collect the peroxides that is produced as a result of the contact with dissolved oxygen in the gas/liquid contacting step and the gypsum slurry that does not elute mercury ions. Then, as a result, the load of a wastewater treatment apparatus that treats the mother liquid separated from the gypsum slurry can be reduced. In other words, advantageous effects similar to those of the invention described in Patent Literature 2 can be obtained.

Note, however, with the method of this invention, humidifying liquid is sprayed vertically downwardly into the flow of exhaust gas in the region where exhaust gas flows vertically downwardly. Therefore, when a drainage tank for collecting the drained humidifying liquid is placed right under the region and the flow of exhaust gas is made to turn sideways in front of it, the humidifying liquid that exists in the flow of exhaust gas as mist is separated from the flow of exhaust gas to the side of the drainage tank due to inertial force (the centrifuge effect). For this reason, the method of the present invention can raise the drained humidifying liquid separation efficiency. Differently stated, it can reduce the amount of drained humidifying liquid that is brought into the gas/liquid contacting step from the comparable amount of the invention of Patent Literature 2. Then, as the amount of gypsum that is brought into the gas/liquid separation step with exhaust gas is reduced, the work load of washing the gypsum adhering to the part of the apparatus for executing the gas/liquid contacting step where exhaust gas flows in is reduced.

Figure 3:
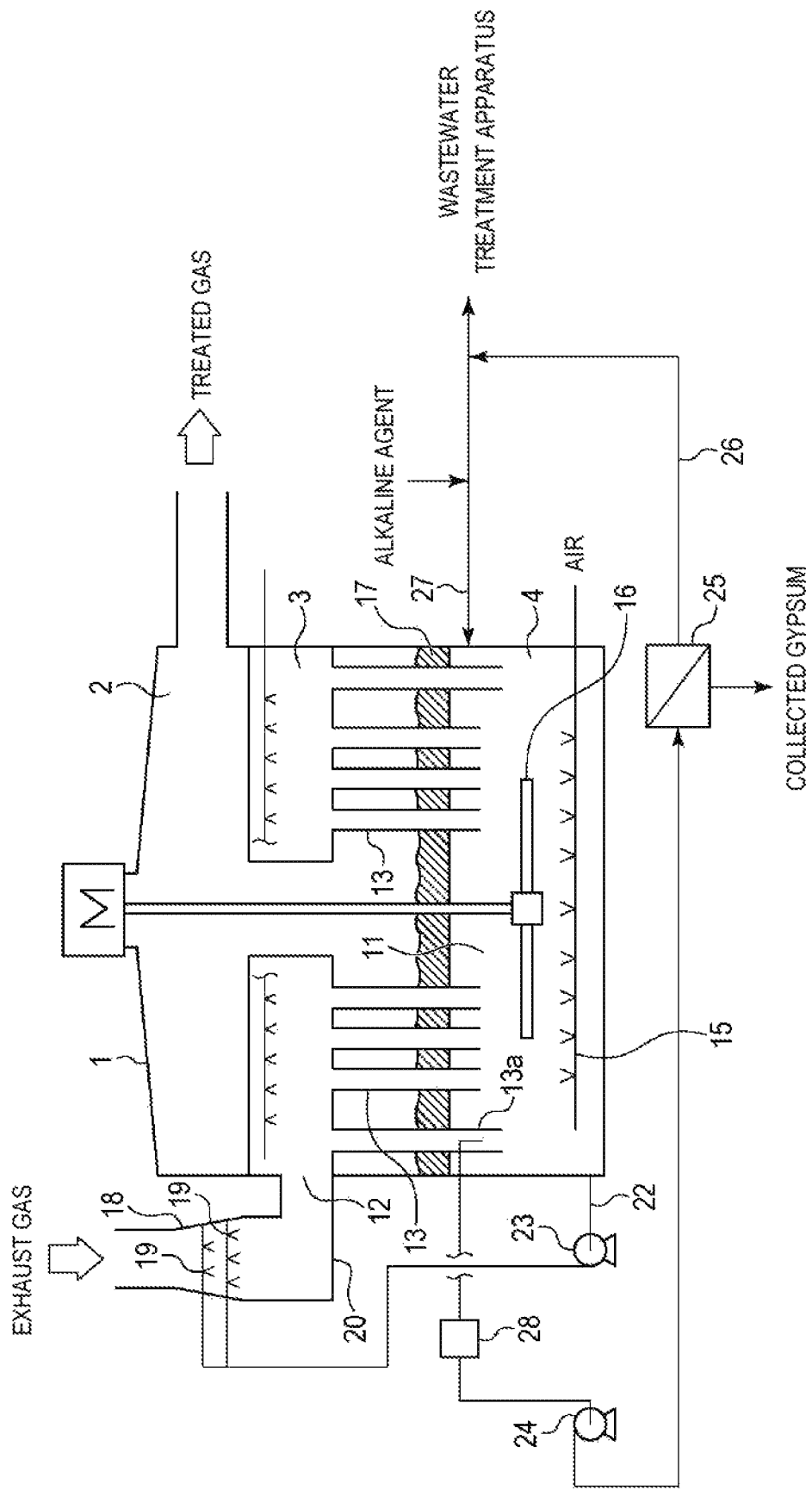
FIG. 3 shows a suitable exemplar continuous liquid phase type wet exhaust gas treatment apparatus according to the present invention.

FIG. 3 shows a suitable exemplar continuous liquid phase type wet exhaust gas treatment apparatus (JBR) for executing the method of the present invention, in which the exhaust gas introducing duct is arranged vertically in a region located slightly in front of the position where the exhaust gas introducing duct is connected to the exhaust gas inflow chamber (middle chamber).

Figure 4:
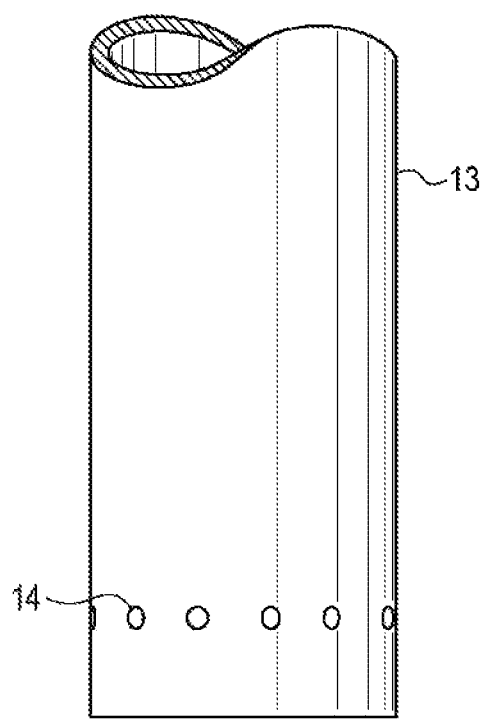
FIG. 4 shows an exemplar gas dispersion pipe to be used in an apparatus shown in FIG. 3.

In the exhaust gas treatment apparatus shown in FIG. 3, the internal space of an upright tubular container 1 is vertically partitioned into three chambers of an upper chamber (treated gas discharge chamber) 2, a middle chamber (exhaust gas introducing chamber 3 and a lower chamber (reaction chamber) 4 and aqueous absorption liquid 11 that contains an alkaline agent and dissolved oxygen is contained in the lower chamber 4, whereas an exhaust gas introducing port 12 is arranged at the lateral wall of the middle chamber 3 to introduce exhaust gas and a plurality of exhaust gas dispersion pipes 13 are arranged so as to run through the floor of the middle chamber 3, become open to the space in the middle chamber and extend vertically with their front ends penetrating into the aqueous absorption liquid 11 contained in the lower chamber 4. Each of the exhaust gas dispersion pipes has near its front end spouting orifices 14 (see FIG. 4) for spouting out exhaust gas into below the liquid surface of the aqueous absorption liquid 11. An oxygen feed means 15 for blowing oxygen-containing gas (for example air) in order to feed the aqueous absorption liquid with dissolved oxygen is arranged near the bottom (at a position lower than the spouting orifices 14) of the lower chamber 4 and a stirring means 16 for vertically stirring the aqueous absorption liquid is arranged right above the oxygen feed means 15.

Sulfur oxides-containing exhaust gas is introduced into the middle chamber 3 from the exhaust gas introducing port 12 and then blown into below the liquid surface (at a depth of several to tens of several centimeters in a state where exhaust gas is not blown into) of the aqueous absorption liquid (hereinafter, referred to simply as "absorption liquid") contained in the lower chamber 4 from the middle chamber 3 by way of the plurality of exhaust gas dispersion pipes 13. The exhaust gas that is blown into below the liquid surface of the absorption liquid 11 is turned into numerous fine bubbles, which then slowly move upward in the absorption liquid to form a jet bubbling layer 17 that contains numerous fine bubbles as the uppermost layer (a layer region between the level of the liquid surface and the level of the spouting orifices 14) of the absorption liquid 11. At the jet bubbling layer 17, the sulfur oxides contained in the bubble-forming exhaust gas are dissolved and absorbed into the absorption liquid by way of the interface of the bubbles and the absorption liquid. In other words, a gas absorbing operation is executed there by way of gas/liquid contact. The bubbles in the jet bubbling layer are fine bubbles formed as a result of repetitive divisions of bubbles caused by the shearing force that arises when exhaust gas is blown into at high speed and have a very large gas/liquid contact area (and hence a high gas/liquid contact efficiency). Moreover, since such bubbles move upward slowly in the jet bubbling layer 17, the sulfur oxides absorption efficiency of the absorption liquid by way of the air/liquid contact interface is high.

The sulfur oxides that are taken into the absorption liquid 11 in the jet bubbling layer 17 are mostly sulfurous acid gas (sulfur dioxide), which will then be bonded to water molecules to become sulfurous acid. Sulfurous acid produces sulfurous acid ions or hydrogen sulfite ions in the absorption liquid, which ions are then oxidized by the dissolved oxygen that is produced as the oxygen blown into from the oxygen feed means 15 is dissolved into water to become sulfuric acid ions (partly hydrogen sulfate ions). The sulfuric acid ions are bonded to the calcium ions that are supplied as a result of dissolution of the alkaline agent (limestone) to produce calcium sulfate. Since the solubility of calcium sulfate is relatively low, gypsum (hydrate of calcium sulfate) deposits in the absorption liquid as solid reaction product. However, the actual reaction does not necessarily proceed in the above-described order and may conceivably more complex. Particularly, the oxidation from sulfurous acid ions into sulfuric acid ions (in a liquid phase or in a solid phase), the production of calcium sulfate (or calcium sulfite in the preceding stage) and the deposition of the solid reaction product (ultimately gypsum) may presumably take place simultaneously and in parallel to a certain extent.

Since the absorption liquid is stirred by the stirring means 16 to circulate in vertical directions, the gypsum particles that are formed and deposited as a result of the reaction of the sulfurous oxide formed as the sulfur oxides are absorbed in the jet bubbling layer 17, which is the uppermost layer, the dissolved oxygen supplied by the oxygen feed means 15 arranged on the bottom of the lower chamber 4 and the calcium ions of the alkaline agent circulate in the entire liquid phase consisting of the absorption liquid 11. Note, however, that they do not necessarily show uniform concentration in the entire liquid phase. Generally, a density distribution that the dissolved oxygen and the gypsum fine particles show a high degree of concentration in lower layers, while the sulfurous acid shows a high degree of concentration in upper layers will be realized. For this reason, the oxidation-reduction potential (ORP) of the absorption liquid is generally high in lower layers than in upper layers (located close to the jet bubbling layer in which sulfurous acid gas is dissolved) and the main body of the absorption liquid 11 except the jet bubbling layer 17 is generally acidic. Therefore, peroxides such as persulfuric acid and hexavalent selenium tend to be produced in the absorption liquid in lower layers. On the other hand, pH of the absorption liquid is generally higher in lower layers than in upper layers but usually pH is made to be slightly on the acidic side even in lower layers to allow the limestone slurry to be dissolved quickly and prevent any new deposition of calcium carbonate from taking place.

In the apparatus shown in FIG. 3, exhaust gas moves downward in an exhaust gas introducing duct 18 that extends vertically at a side of the smoke exhaust desulfurization apparatus, turns sideways on a lateral side of the exhaust gas introducing port 12 (to show an L-shaped flow) before it flows into the middle chamber 3 from the exhaust gas introducing port 12. A plurality of humidifying liquid injection nozzles 19 are arranged horizontally at regular intervals in 1 to 3 tiers (2 tiers in FIG. 3) in the inside of the vertically extending region and humidifying liquid is injected downwardly into the falling flow of exhaust gas from each of the nozzles. Since same injection pressure (pump head–injection nozzle hydraulic head) is applied to the horizontally arranged plurality of humidifying liquid injection nozzles, in principle, humidifying liquid is sprayed by the same injection amount, at the same injection speed and with the same drop diameter provided that the injection nozzles have the same structure. In this embodiment, since the plurality of humidifying liquid injection nozzles are arranged in two tiers and the nozzles in the upper tier and the nozzles in the lower tier show a head difference and hence a difference of injection pressure can arise due to the head difference. However, so long as the nozzles in each of the tiers are uniformly arranged, humidifying liquid will evenly be sprayed as a whole in any cross section that is perpendicular to the flow of exhaust gas. Note that, in the apparatus shown in FIG. 3, the absorption liquid in lower layers that is drawn out from an absorption liquid drawing out port 22 arranged at the bottom section of the lower chamber 4 and transferred to the humidifying liquid injection nozzles 19 by means of a pump 23 is employed for the humidifying liquid to be injected from the humidifying liquid injection nozzles 19.

Preferably, a single humidifying liquid injection nozzle having a structure for injecting liquid in a conical form with uniform density is or a plurality of such nozzles are employed. However, the present invention is not limited to the use of such a nozzle or such nozzles and it is sufficient that the nozzle is or nozzles are so arranged as to uniformly spray liquid relative to any horizontal cross section of the vertically extending exhaust gas introducing duct as a whole. For example, nozzles having different structures may be combined for use. Techniques for uniformly arranging a plurality of humidifying liquid injection nozzles in each of the tiers non-limitatively include a technique of arranging them on the respective vertices of equilateral triangles as shown in FIG. 5 (a) and a technique of arranging them on concentric circles as shown in FIG. 5 (b). Generally, when the exhaust gas introducing duct shows a circular cross section, the nozzles are preferably arranged on concentric circles but, when the duct shows any other cross section, they are preferably arranged on the respective vertices of equilateral triangles. Regardless if either of the arrangements is adopted, care should be taken to arrange the nozzles so as to make them show a uniform placement density in the horizontal cross section.

The humidifying liquid injection nozzles 19 are arranged in the region where the exhaust gas introducing duct 18 extends vertically and the vertically extending region preferably has a straight length of about 2.5 to 5.0 m. When, on the other hand, the region has a straight length of about 5 m under on the downstream side of the humidifying liquid injection nozzles, the flow of exhaust gas that runs in the inside of the exhaust gas introducing duct is rectified and the flow speed distribution in cross sections that are perpendicular to the flow becomes symmetrical relative to the center of the flow (the flow speed distribution is the same in all directions from the center to the circumference), while the flow speed becomes substantially uniform except a part located close to the inner wall of the duct (a part so-called "boundary film") at the same time, so that, when a plurality of nozzles having the same structure are arranged on a cross section that is perpendicular to the flow, humidifying liquid will be sprayed substantially uniformly relative to the flow.

Additionally, for (part of) the moisture in the humidifying liquid sprayed into the flow of exhaust gas to evaporate and effectively humidify and cool the exhaust gas, the time during which the liquid drops of the humidifying liquid float in the flow of exhaust gas needs to be at least about 0.5 seconds (provided that the 50% average particle diameter of the liquid drops is not greater than 2,000 μm). To meet this requirement, if the exhaust gas flow speed is assumed to be about 15 m/s, the length from the position where humidifying liquid is sprayed into the flow of exhaust gas to the position where the humidifying liquid is separated from the flow of exhaust gas as drained humidifying liquid needs to be about 8 m. Therefore, in an instance where the flow of exhaust gas is turned to become L-shaped in order to separate the drained humidifying liquid by centrifugal force, the straight distance from the position where the humidifying liquid injection nozzles are arranged to the bent part of the L-shape needs to be about 8 m. From the above, the length from the position where humidifying liquid is sprayed into the flow of exhaust gas to the position where humidifying liquid is separated from the flow of exhaust gas as drained humidifying liquid is preferably at least about 8 m.

The injected humidifying liquid floats in the exhaust gas as fine drops and humidifies and cools the exhaust gas as the moisture thereof is evaporated by the heat of the exhaust gas. A part of the liquid drops that are left unevaporated accompanies the exhaust gas and flows into the middle chamber 3 while another part is separated from the flow of exhaust gas (due to the principle of centrifugal force particularly at the bent position of the L-shape) and simply falls down to collide with a bottom plate 20 of the vertical region and becomes drainage of humidifying liquid. In the apparatus shown in FIG. 3, the drained humidifying liquid flows on the bottom surface, penetrates into the middle chamber 3 of the tubular container 1 and then flows down in the liquid down corner pipe 13a arranged near the exhaust gas introducing port on the floor surface of the middle chamber. Like the gas dispersion pipes 13, the liquid down corner pipe 13a is open to the space in the middle chamber 3 and runs through the floor of the middle chamber 3 so as to vertically extend with its front end penetrating into the aqueous absorption liquid 11 contained in the lower chamber 4. Note, however, that, since its front end gets to a position located deeper than the front ends of the exhaust gas dispersion pipes 13, no exhaust gas will be spouted out from its front end part and the drained humidifying liquid that has fallen from floor of the middle chamber 3 stays in the front end part and then flows out into the absorption liquid 11 in the lower chamber 4 little by little. Therefore, liquid that mostly consists of humidifying liquid can be collected by drawing out the drained humidifying liquid staying in and near the front-end part of the liquid down corner pipe 13a by means of a pump 24. The drawing out speed is preferably not greater than the speed by which the drained humidifying liquid falls down. This is because, when the drawing out speed is greater than the latter speed, the absorption liquid 11 in the lower chamber 4 penetrates from the front end of a liquid down corner pipe 13a and becomes mixed with the drained humidifying liquid. Note that a degassing means 28 is arranged on the way in order to prevent bubbles from getting into the pump 24.

The drained humidifying liquid that are dawn out from near the front-end part of the liquid down corner pipe 13a is transferred to a solid/liquid separation means 25 by means of the pump 24 and the solid (gypsum) is collected. The mother liquid that is left after the collection and elimination of the solid is mostly returned to the inside of the lower chamber 4 from an absorption liquid feed port 27 by way of a circulation line 26 so as to be used again as absorption liquid. At this time, an alkaline agent (slurry of limestone) is added to the circulated mother liquid to replenish the part that is collected as gypsum. Note, however that a part is drawn out and fed to the wastewater treatment apparatus in order to prevent accumulation of salts and dust in the absorption liquid. At this time, if the mother liquid contains persulfuric acid and hexavalent selenium, they adversely affect the wastewater treatment apparatus (in particular the ion exchange apparatus for eliminating the COD fractions in the wastewater). However, with a preferable embodiment of the method and that of an apparatus according to the present invention as shown in FIG. 3, because only drained humidifying liquid is subjected to a solid/liquid separating operation and hence the mother liquid from which gypsum has been collected and eliminated practically does not contain any peroxides, it practically does not adversely affect the wastewater treatment apparatus.

Figure 6:
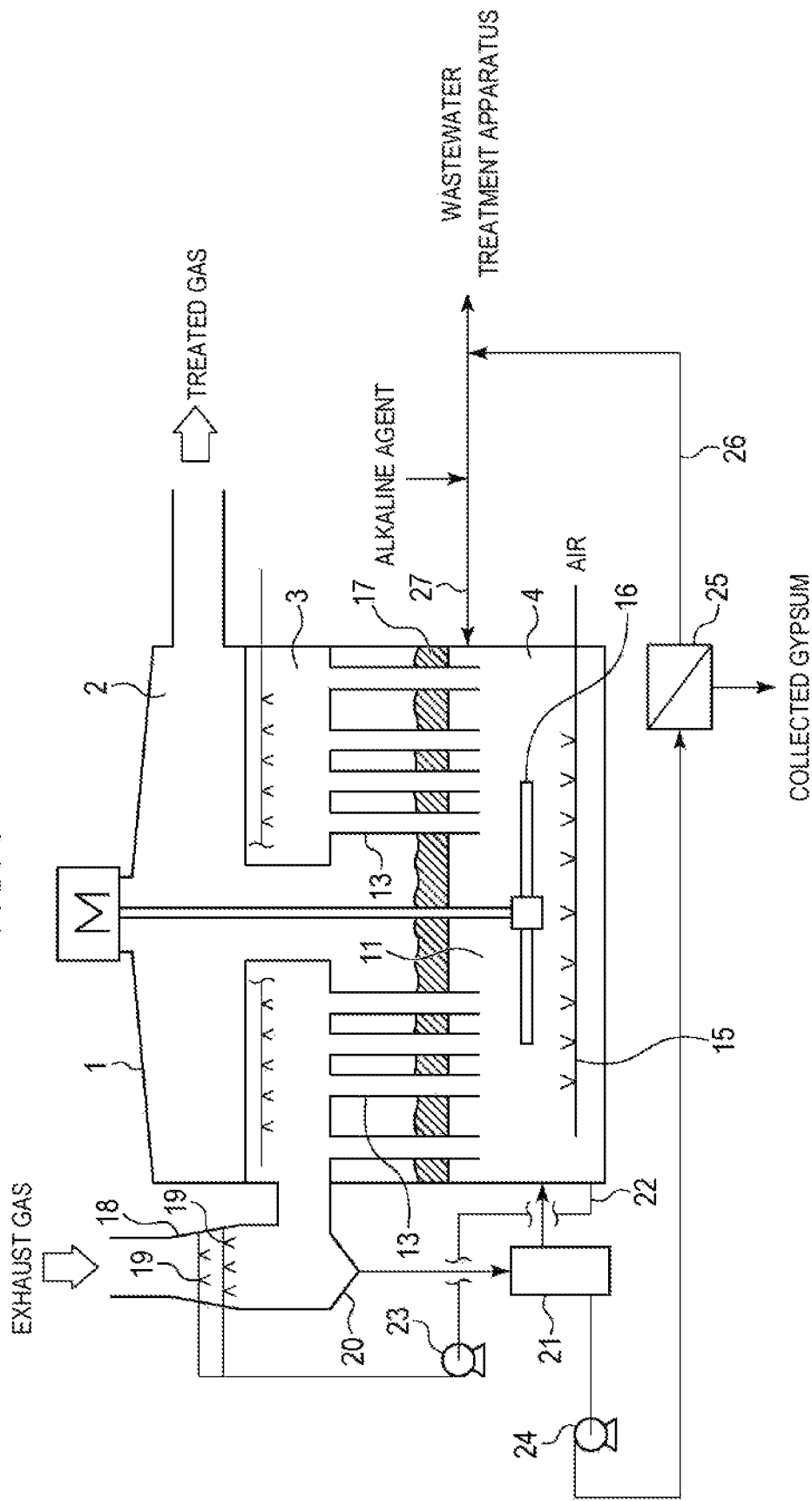
FIG. 6 shows another suitable exemplar continuous liquid phase type wet exhaust gas treatment apparatus according to the present invention.

FIG. 6 shows another preferable example of continuous liquid phase type wet exhaust gas treatment apparatus (JBR) for embodying the method of the present invention. In the apparatus shown in FIG. 6, the liquid drops of humidifying liquid that are separated from the flow of exhaust gas collide with the bottom plate 20 of the vertical region and caught and gathered in the inside of a drainage tank 21 as drained humidifying liquid. The drainage tank 21 may be held in communication with the lower chamber 4 of the tubular container 1 as shown in FIG. 6. If such is the case, however, care should be taken because the absorption liquid 11 in the lower chamber 4 is directly drawn out and mixed with the drained humidifying liquid unless the amount by which drained humidifying liquid flows into the drainage tank 21 exceeds the amount by which drained humidifying liquid is drawn out from the drainage tank by means of the pump 24.

When the drained humidifying liquid that has been separated from the exhaust gas is to be separated and collected at the bent part of the L-shape arranged right under the vertical region where the humidifying liquid injection nozzles are arranged, the drained humidifying liquid will be collected as it collides with the bottom plate 20 of the L-shaped bent part. If such is the case, therefore, it is preferable that the bottom plate is formed to show a funnel-like shape or an inverted cone shape that shows a V-shaped cross section and the drained humidifying liquid that has collided with the bottom plate can smoothly be collected there. Note, however, that the part where drained humidifying liquid is collected from exhaust gas may not necessarily be formed as an L-shaped bent part and may alternatively be formed to show a slightly gentler curve for bending the vertical exhaust gas flow sideways.

Since the drainage tank 21 is a container for containing the drained and collected humidifying liquid, it may not necessarily have an exceptionally special structure but, when it is held in communication with the lower chamber 4 of the tubular container 1, the liquid surface of the drainage tank 21 becomes substantially flush with the liquid surface in the lower chamber and hence the piping between it and the exhaust gas introducing duct 18 needs to be hermetically sealed so as not to allow liquid to leak therefrom. Note that the height of the position at which the drainage tank 21 communicates with the lower chamber 4 is preferably at least lower than the lower surface of the jet bubbling layer so that the high gas/liquid contact efficiency in the jet bubbling layer may not adversely be affected. Besides, while a belt traveling type vacuum filter, a centrifugal separator or the like is more often than not employed as the solid/liquid separation means 25 for separating and collecting gypsum, the present invention is not limited to the use of such a one but any other appropriate solid/liquid separation means may alternatively be employed.

Figure 7:
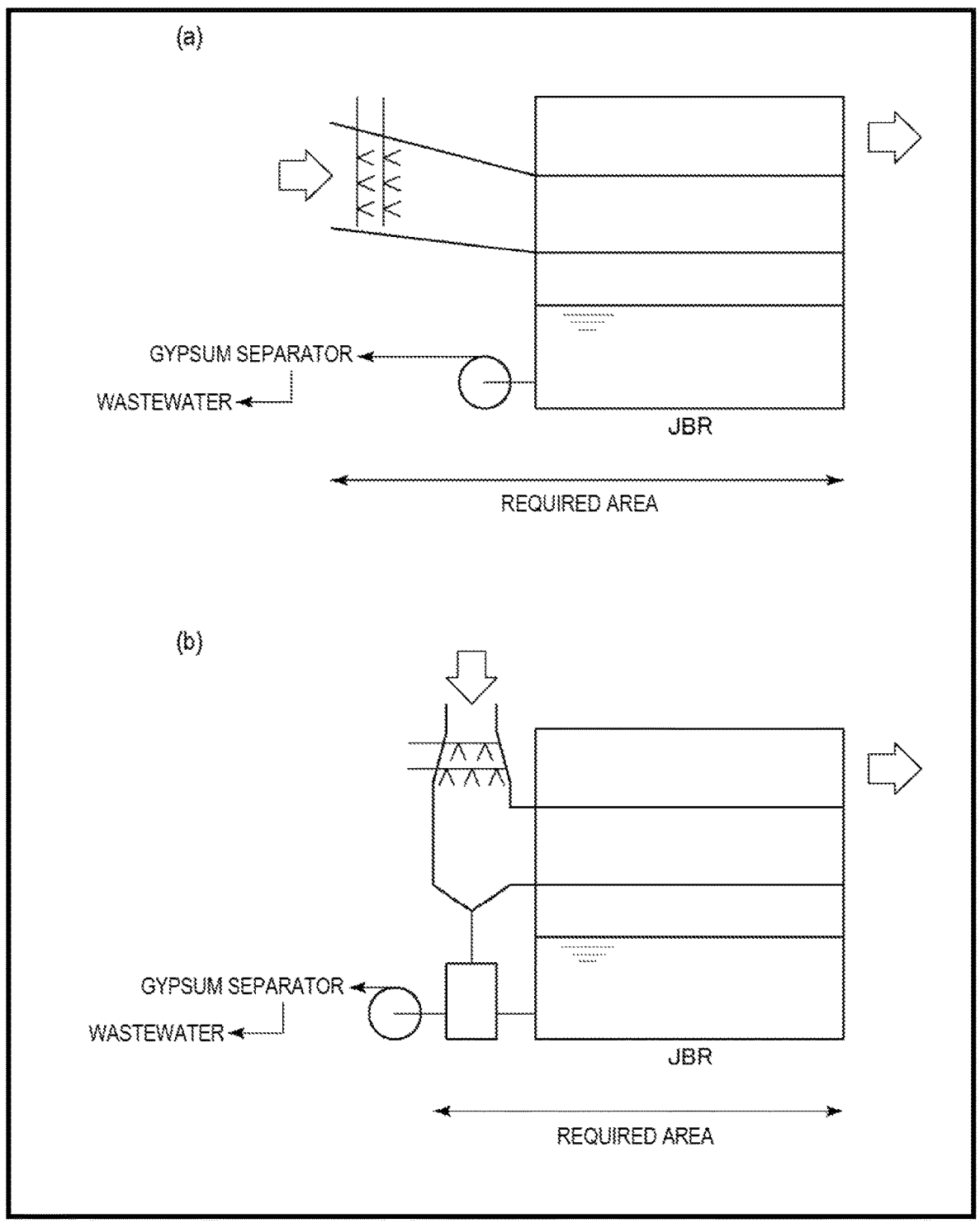
FIG. 7 shows the installation area of an instance where an exhaust gas introducing duct is vertically arranged and the installation area of an instance where the exhaust gas introducing duct is horizontally arranged for comparison.

FIG. 7 schematically illustrates that the use of the method of the present invention can reduce the installation area of an exhaust gas treatment apparatus including an exhaust gas introducing duct. FIG. 7 (a) shows an instance where a conventional method of injecting humidifying liquid in a horizontal direction into a horizontal flow of exhaust gas is employed and FIG. 7 (b) shows an instance where the method of the present invention of injecting humidifying liquid downwardly into a vertical downward flow of exhaust gas. As described above, it is necessary to make exhaust gas and humidifying liquid contact with each other for a sufficient period of time for the purpose of effectively humidifying and cooling exhaust gas and, for this purpose, a certain distance (about several meters) needs to be provided between the position at which humidifying liquid is injected and the position at which exhaust gas flows into the apparatus main body. Then, with the conventional method shown in FIG. 7 (a), the straight part of the piping needs to be extended so much. However, with the method of the present invention shown in FIG. 7 (b), it is sufficient to vertically extend the straight part of the piping so that it is not necessary to increase the installation area. This fact is particularly advantageous for JBRs because their selling point is compactness.

Apparatus that are suitable for embodying the method of the present invention are described above. However, embodiments of the method of the present invention are by no means limited to the ones that employ the above-described apparatus and the method of the present invention can be embodied by employing any continuous liquid phase type wet exhaust gas treatment apparatus having an exhaust gas introducing duct that includes a region where the exhaust gas introduced into an upright tubular container flows vertically downwardly and arranged to spray humidifying liquid downwardly into the vertical region.

EXAMPLES

Example

Figure 8:
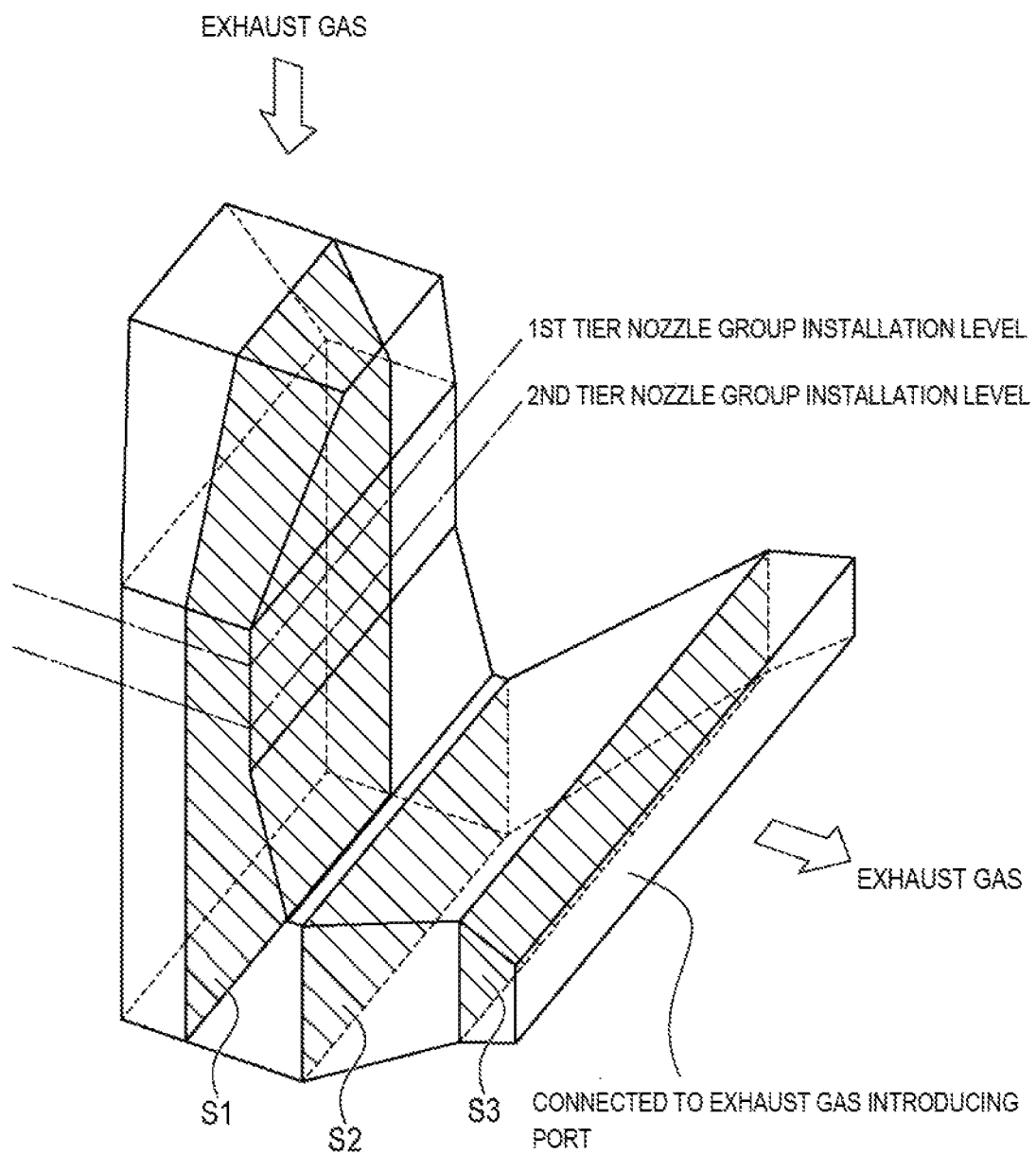
FIG. 8 shows the part where the exhaust gas introducing duct is connected to the reaction tank employed in Example.

A simulation experiment of spraying humidifying liquid into exhaust gas was executed by using actual scale JBR experimental equipment. The exhaust gas introducing duct part of a JBR apparatus of normal specifications was altered to provide a region where exhaust gas flows vertically downwardly and humidifying liquid injection nozzles were arranged in two tiers in the middle of the region. As shown in FIG. 8, the exhaust gas introducing duct showed a cross section of a rectangle of 8,500 mm×2,500 mm at the site where the nozzles were arranged. As the first tier (upper tier) nozzle group, 12 nozzle pipes having respective injection holes (nozzles) on the lower sides thereof were arranged horizontally side by side and in parallel at regular intervals of about 700 mm and, as the second tier (lower tier) nozzle group, 13 nozzle pipes having a profile same as that of the nozzles of the first tier were arranged horizontally side by side and in parallel at the same intervals. The nozzle group of the first tier and the nozzle group of the second tier were vertically separated by about 1,000 mm. The nozzles of the first tier and the nozzles of the second tier were arranged in a staggered manner in a horizontal direction.

The vertical region of the exhaust gas introducing duct extended from about 1,000 mm above the first tier nozzle group on the upstream side (upper side) to about 1,000 mm below the second tier nozzle group on the downstream side (lower side). As shown in FIG. 8, the shape of the cross section of the vertical region of the exhaust gas introducing duct was not uniform in the entire region. It was rectangular and flatter on the downstream side including the region where the nozzles were arranged than on the upstream side. Additionally, the duct was bent at the front end of the vertical region on the downstream side to become L-shaped and connected to the exhaust gas introducing port arranged on the lateral wall of the middle chamber of the JBR experimental equipment.

Figure 9:
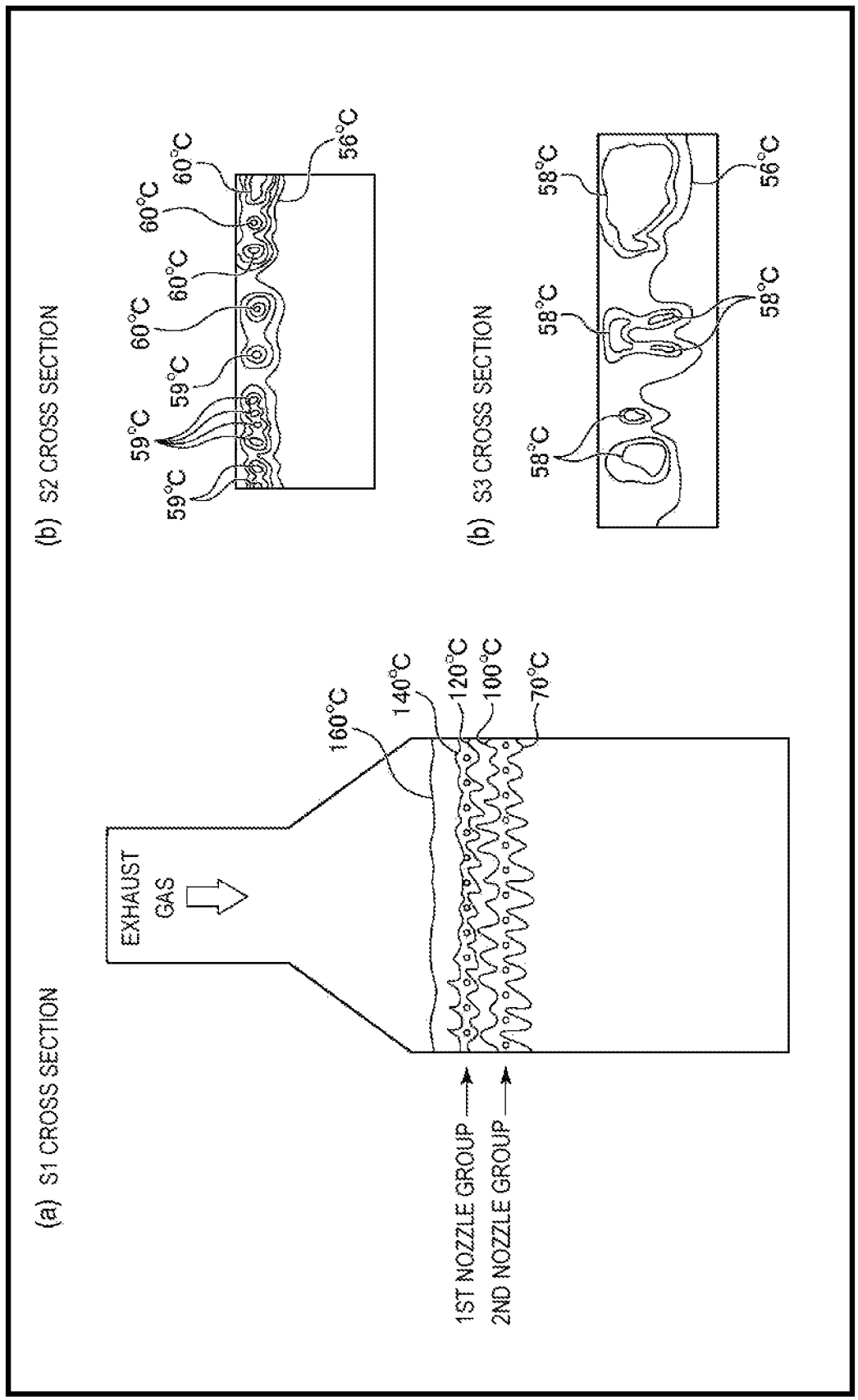
FIG. 9 shows the temperature distributions in the cross sections of S1, S2 and S3 in FIG. 8.

Air showing a temperature of about 160° C. was made to flow in the above-described exhaust gas introducing duct at a flow rate of about 1,000.000 m³/h and water showing a temperature of about 56° C. was injected from each of the nozzles of the first tier and the second tier at a total flow rate of about 1,300 m³/h. Then, the temperature distribution on each of the S1 cross section, the S2 cross section and the S3 cross section shown in FIG. 8 was observed from a plurality of measurement seats by means of thermometers. FIG. 9 schematically shows the respective temperature distributions on the S1 cross section, the S2 cross section and the S3 cross section by means of isotherms.

As shown in FIG. 9 (a), the air showing the temperature of about 160° C. was cooled to 100 to 120° C. by the injection of water from the first tier nozzle group and further cooled to not higher than 70° C. by the injection of water from the second tier nozzle group. At this time, as a whole, the air was cooled substantially uniformly in a well-balanced manner on the cross section (in horizontal directions). As shown in FIGS. 9 (b) and (c), the temperature of the air flow was cooled to not higher than 60° C. on the cross section located immediately in front of the exhaust gas introducing port in the entire region including the areas located near the inner wall of the duct and no gas region that locally showed high temperature existed.

Comparative Example

Figure 10:
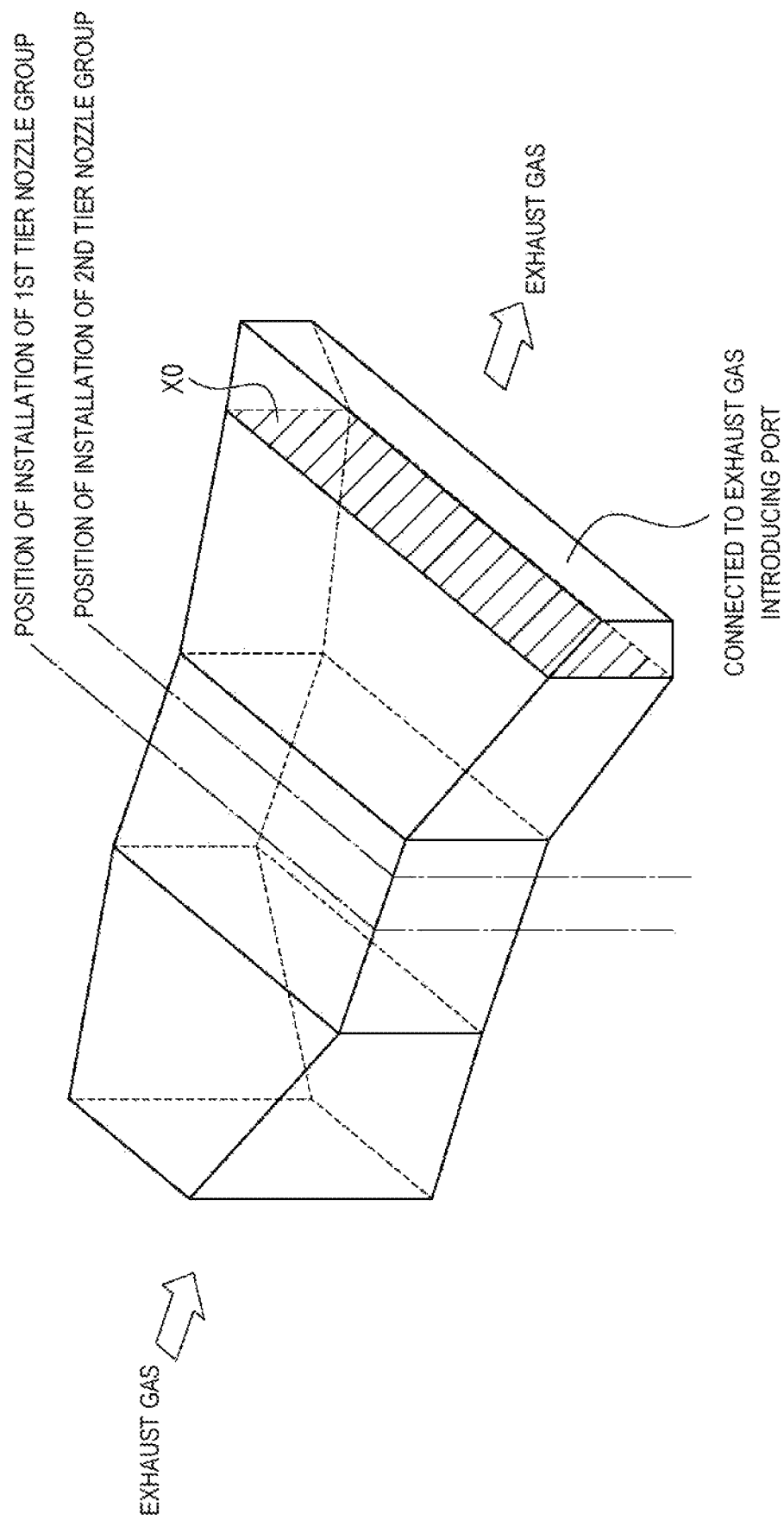
FIG. 10 shows the part where the exhaust gas introducing duct is connected to the reaction tank employed in Comparative Example.

A test of spraying humidifying liquid into exhaust gas was executed as in Example by using actual scale JBR experimental equipment. In the comparative example, the exhaust gas introducing duct part of a JBR apparatus of normal specifications was employed without any alterations. In other words, no region where exhaust gas flows vertically downwardly was provided and humidifying liquid injection nozzles were arranged in two tiers in the middle of the region where exhaust gas flows horizontally. As shown in FIG. 10, the cross section of the exhaust gas introducing duct at the nozzle arrangement site was a rectangle of 8,500 mm 2,500 mm as in Example. As the first tier (left side) nozzle group, 12 nozzle pipes having respective injection holes (nozzles) on a lateral surface thereof were arranged vertically side by side and in parallel at regular intervals of about 700 mm and, as the second tier (right side) nozzle group, 13 nozzle pipes having a profile same as that of the nozzles of the first tier were arranged vertically side by side and in parallel at the same intervals. The nozzle group of the first tier and the nozzle group of the second tier were horizontally separated by about 1,000 mm. The nozzles of the first tier and the nozzles of the second tier were arranged in a staggered manner in a horizontal direction.

As shown in FIG. 10, the shape of the cross section of the vertical region of the exhaust gas introducing duct was not uniform in the entire region. It was rectangular and flatter on the downstream side including the region where the nozzles were arranged than on the upstream side. Additionally, the duct was connected on the downstream side to the exhaust gas introducing port arranged on the lateral wall of the middle chamber of the JBR experimental equipment at a position located at about 7,000 mm ahead of the second tier nozzle group.

Figure 11:
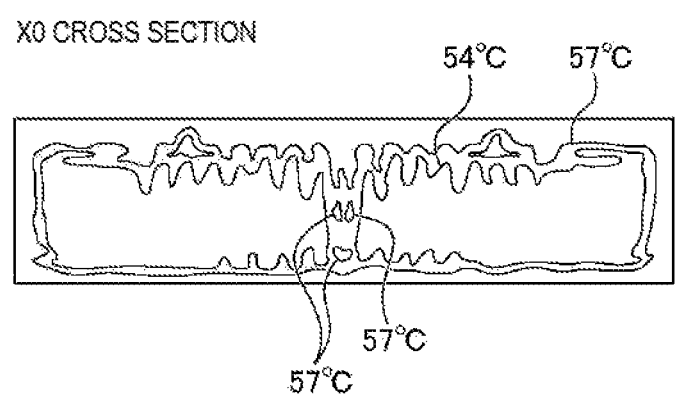
FIG. 11 shows the temperature distribution of exhaust gas in the cross section of X0 in FIG. 10.

Air showing a temperature of about 160° C. was made to flow in the above-described exhaust gas introducing duct at a flow rate of about 1,000,000 m$^3$ and water was injected from each of the nozzles of the first tier and the second tier at a total flow rate of about 1,300 m$^3$/h. Then, the temperature distribution on the X0 cross section shown in FIG. 10 was observed as in Example. FIG. 11 schematically shows the temperature distribution on the X0 cross section by means of isotherms.

The temperature distribution of the air flow on the cross section located immediately in front of the exhaust gas introducing port shown in FIG. 11 showed that there locally existed gas regions whose temperature was not lower than 57° C. and hence that were not sufficiently cooled in peripheral cross sectional regions located near the inner wall of the duct, particularly along the ceiling and the lateral wall of the duct.

This application claims the priority of Japanese Patent Application No. 2018-6273 filed on Jan. 18, 2018, which is hereby incorporated by reference herein in its entirety.

REFERENCE SIGNS LIST

1: Tubular container
2: Upper chamber (treated gas discharge chamber)
3: Middle chamber (exhaust gas introducing chamber)
4: Lower chamber (reaction chamber)
11: Aqueous absorption liquid
12: Exhaust gas introducing port
13: Exhaust gas dispersion pipe
14: Spouting orifice
15: Oxygen feed means
16: Stirring means
17: Jet bubbling layer
18: Exhaust gas introducing duct
19: Humidifying liquid injection nozzle
20: Bottom plate of vertical region
21: Drainage tank
22: Absorption liquid drawing out port
23: Pump
24: Pump
25: Solid/liquid separation means
26: Circulation line
27: Absorption liquid feed port
28: Degassing means
101, 201: Container
102, 202: Lower chamber (reaction chamber)
104, 204: Absorption liquid
105, 205: Middle chamber (exhaust gas inflow chamber)
106, 206: Exhaust gas dispersion pipe (gas down corner pipe)
107, 207: Upper chamber (treated exhaust gas outflow chamber)
108, 208: Oxygen feed means
109, 209: Jet bubbling layer
110, 210: Stirring means
111, 211: Exhaust gas introducing duct
112, 212: Cooling liquid injection nozzle
113, 213: Absorption liquid injection nozzle
214: Absorption liquid drawing out pipe
218: Liquid down corner pipe
221: Solid body separation means

The invention claimed is:

1. An exhaust gas treatment method of eliminating sulfur oxides from exhaust gas and collecting the eliminated sulfur oxides as solid reaction product, the method comprising:
   a gas/liquid contacting step of depositing the reaction product of a reaction of an alkaline agent, dissolved oxygen and sulfur oxides in an aqueous absorption liquid by executing a gas/liquid contacting operation of introducing sulfur oxides-containing exhaust gas into the aqueous absorption liquid containing the alkaline agent and dissolved oxygen in such a way that the sulfur oxides-containing exhaust gas is spouted below a liquid surface of the aqueous absorption liquid; and
   a solid/liquid separation step of collecting the solid reaction product by executing a solid/liquid separating operation relative to the aqueous absorption liquid containing the deposited solid reaction product;
   the method additionally comprising:
   a humidifying/cooling step of humidifying and cooling the exhaust gas by spraying humidifying liquid into the flow of exhaust gas prior to the gas/liquid contacting step;
   humidifying liquid being injected vertically downwardly in a region where exhaust gas flows vertically downwardly.

2. The method according to claim 1, wherein
   the aqueous absorption liquid containing the deposited solid reaction product is employed as at least part of the humidifying liquid and the humidifying liquid sprayed into the exhaust gas is separated from the exhaust gas and collected as drained humidifying liquid so as to execute the solid/liquid separating operation only on the collected drained humidifying liquid.

3. The method according to claim 1, wherein
   the vertical downward flow of the exhaust gas after spraying the humidifying liquid to it is turned sideways and the humidifying liquid sprayed into the exhaust gas is separated and collected right below the position where the flow is turned sideways by utilizing the effect of centrifugal force of turning the flow of the exhaust gas.

4. The method according to claim 1, wherein
   the alkaline agent in the aqueous absorption liquid is supplied as limestone slurry.

5. An exhaust gas treatment apparatus comprising:
   an upright tubular container having an internal space vertically partitioned into three chambers of an upper chamber, a middle chamber and a lower chamber as viewed in the vertical direction;
   the lower chamber containing aqueous absorption liquid in turn containing an alkaline agent and dissolved oxygen;
   the middle chamber having at the lateral wall thereof an exhaust gas introducing port for introducing exhaust gas and on the bottom thereof a plurality of exhaust gas dispersion pipes open to the internal space of the middle chamber and running through the floor thereof, the exhaust gas dispersion pipes vertically extending with their front ends penetrating into the aqueous absorption liquid contained in the lower chamber, each of the exhaust gas dispersion pipes having near its front end spouting orifices for spouting exhaust gas below the liquid surface of the aqueous absorption liquid;

the lower chamber also having near the bottom thereof an oxygen feed means for blowing oxygen-containing gas into the aqueous absorption liquid and at the ceiling thereof a treated gas rising path open to the internal space of the lower chamber and running through the middle chamber so as to be open to the internal space of the upper chamber;

the upper chamber having a treated gas discharge port for discharging treated gas; and the exhaust gas treatment apparatus being so arranged that the exhaust gas introduced into the middle chamber from the exhaust gas introducing port is spouted out as bubbles below the liquid surface of the aqueous absorption liquid contained in the lower chamber by way of the plurality of exhaust gas dispersion pipes, subsequently separated as treated gas in the space formed on the liquid surface of the aqueous absorption liquid and then forced to flow into the upper chamber by way of the treated gas rising path so as to be discharged from the upper chamber by way of the treated gas discharge port;

wherein an exhaust gas introducing duct having an vertically extending region for allowing exhaust gas to flow downwardly is connected to the exhaust gas introducing port and a humidifying liquid injection means for spraying humidifying liquid downwardly into the downwardly flowing exhaust gas in the exhaust gas introducing duct is arranged in the vertically extending region.

6. The apparatus according to claim 5, wherein the humidifying liquid injection means includes a plurality of humidifying liquid injection nozzles arranged on a horizontal cross section in the vertically extending region.

7. The apparatus according to claim 5, wherein the lower chamber has an absorption liquid drawing out port for drawing out the aqueous absorption liquid in the lower chamber and a liquid path is formed to extend from the absorption liquid drawing out port to the humidifying liquid injection means such that the aqueous absorption liquid drawn out from the absorption liquid drawing out port is sprayed into the exhaust gas from the humidifying liquid injection means by way of the liquid path as humidifying liquid.

8. The apparatus according to claim 5, wherein the exhaust gas introducing duct is connected to the exhaust gas introducing port at a position located below the vertically extending region and ahead of the position turned sideways and a drainage tank for collecting drained humidifying liquid is arranged right below the position where the exhaust gas introducing duct is turned sideways.

* * * * *